（12）United States Patent
Furuskär et al.

(10) Patent No.: US 9,204,328 B2
(45) Date of Patent: Dec. 1, 2015

(54) METHOD AND ARRANGEMENT FOR DETERMINING A CHANNEL QUALITY OFFSET

(75) Inventors: Anders Furuskär, Stockholm (SE); Magnus Lundevall, Sollentuna (SE); Per Skillermark, Årsta (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 169 days.

(21) Appl. No.: 13/704,392

(22) PCT Filed: Jul. 1, 2010

(86) PCT No.: PCT/SE2010/050756
§ 371 (c)(1),
(2), (4) Date: Dec. 14, 2012

(87) PCT Pub. No.: WO2012/002858
PCT Pub. Date: Jan. 5, 2012

(65) Prior Publication Data
US 2013/0094388 A1     Apr. 18, 2013

(51) Int. Cl.
*H04W 24/10*      (2009.01)
*H04L 1/00*       (2006.01)
*H04L 1/20*       (2006.01)
*H04L 5/00*       (2006.01)
*H04B 17/24*      (2015.01)
*H04B 17/309*     (2015.01)
*H04B 17/382*     (2015.01)

(52) U.S. Cl.
CPC ............. *H04W 24/10* (2013.01); *H04B 17/24* (2015.01); *H04B 17/309* (2015.01); *H04B 17/382* (2015.01); *H04L 1/0026* (2013.01); *H04L 1/20* (2013.01); *H04L 5/0053* (2013.01)

(58) Field of Classification Search
None
See application file for complete search history.

(56) References Cited

U.S. PATENT DOCUMENTS

| 9,037,091 B2 * | 5/2015 | Sun et al. ................... 455/67.11 |
| 2004/0142698 A1 | 7/2004 | Pietraski |
| 2004/0266358 A1 * | 12/2004 | Pietraski et al. ........... 455/67.11 |
| 2006/0133402 A1 | 6/2006 | Dottling et al. |
| 2007/0173201 A1 * | 7/2007 | Pietraski et al. ........... 455/67.11 |
| 2008/0081655 A1 * | 4/2008 | Shin et al. ...................... 455/522 |
| 2010/0067396 A1 | 3/2010 | Cui et al. |
| 2012/0021693 A1 * | 1/2012 | Wintzell et al. ............ 455/67.11 |
| 2012/0099471 A1 * | 4/2012 | Brannstrom et al. ......... 370/252 |
| 2013/0035132 A1 * | 2/2013 | Shin et al. ...................... 455/522 |
| 2014/0086182 A1 * | 3/2014 | Shin et al. ...................... 370/329 |

FOREIGN PATENT DOCUMENTS

EP      1592139 A2    11/2005
WO    2006075208 A1    7/2006

(Continued)

*Primary Examiner* — Donald Mills
(74) *Attorney, Agent, or Firm* — Patent Portfolio Builders, PLLC

(57) ABSTRACT

A method and an arrangement in a first radio network node for determining a channel quality offset for a radio channel for sending data from the first radio network node to a user equipment are provided. The first radio network node receives from the user equipment channel quality information for the radio channel. The first radio network node estimates resource utilization and signal-to-noise-ratio for the user equipment. The first radio network node determines the channel quality offset based on the received channel quality information, the estimated resource utilization and the estimated signal-to-noise-ratio.

8 Claims, 4 Drawing Sheets

(56) References Cited

FOREIGN PATENT DOCUMENTS

| WO | 2008143566 | A1 | 11/2008 |
| WO | 2009100775 | A1 | 8/2009 |
| WO | 2010027307 | A1 | 3/2010 |

\* cited by examiner

METHOD AND ARRANGEMENT FOR DETERMINING A CHANNEL QUALITY OFFSET

TECHNICAL FIELD

The present invention relates to a method and an arrangement in a first radio network node for determining a channel quality offset for a radio channel for sending data from the first radio network node to a user equipment.

BACKGROUND

In existing radio communication systems, such as a telecommunication system or a mobile cellular system, transmission parameters such as modulation, channel coding, precoding weights, and transmission rank (number of MIMO layers) are often dynamically determined in order to adapt the system to the varying channel conditions. In this manner, data rates in the systems, such as wireless networks, may be improved. An estimation of the channel characteristics is required to be able to determine such transmission parameters dynamically. The estimation of the channel characteristics is often performed at the receiver side of the channel whose characteristics is to be estimated. However, such estimation may also be performed at the transmitter side.

In the LTE standard, a mobile station, also known as a User Equipment or UE for short, estimates the channel characteristics, and selects an appropriate set of transmission parameters, such as transmission rank and precoding weights. The mobile station also estimates what channel quality may be obtained with the selected transmission parameters. The channel quality and the selected set of transmission parameters are reported to the first radio network node 110 in a channel quality report. Then the base station decides what transmission parameters shall be used. The base station may, hence, modify the transmission parameters reported by the mobile station to the base station.

In WO/2009/100775, there is disclosed a method for link quality estimation, in which the transmitter gets a channel quality report from the receiver. The transmitter also calculates an estimate of the channel quality. If the estimate differs from the estimate derived from the channel quality report, the transmitter sends an offset to the receiver, which uses the offset to adjust the estimate to be reported. An example method for the base station's quality estimate is to monitor the error rate using ACK/NACK reports from the mobile station. Such an outer loop is typically slow in compensating for too pessimistic values, since it only adjusts the channel quality estimate by a small amount (at most) at every reception of an ACK/NACK feedback from the mobile. Even for continuous traffic, the channel quality estimate in the base station will be pessimistic during a long time.

SUMMARY

An object of the present invention is to provide an improved method for determining a channel quality offset for use by a user equipment when generating a channel quality report.

According to an aspect of the invention, the object is achieved by a method in a first radio network node for determining a channel quality offset for a radio channel for sending data from the first radio network node to a user equipment. In a step, the first radio network node receives from the user equipment channel quality information for the radio channel. In another step, the first radio network node estimates resource utilization and signal-to-noise-ratio for the user equipment. In a further step, the first radio network node determines the channel quality offset based on the channel quality information, the resource utilization and the signal-to-noise-ratio.

According to another aspect of the invention, the object is achieved by an arrangement in a first radio network node for determining a channel quality offset for a radio channel for sending data from the first radio network node to a user equipment. The arrangement may comprise a receiving unit configured to receive from the user equipment channel quality information for the radio channel and a processing unit configured to estimate resource utilization and signal-to-noise-ratio for the user equipment. The processing unit further is configured to determine the channel quality offset based on the channel quality information, the resource utilization and the signal-to-noise-ratio.

The present inventors have realized that the difference between a true signal-to-noise-and-interference-ratio (SINR) and a SINR estimated based on the CRS depends on the resource utilization in the network (also known as load) and the signal to noise ratio (SNR) without interference. Therefore, by estimating resource utilization and signal-to-noise-ratio for the user equipment, the first radio network node may determine the channel quality offset based on the channel quality information, the resource utilization and the signal-to-noise-ratio. Hence, it is possible to adjust the channel quality offset in larger steps, i.e. faster, than in prior art solutions in which it is may be necessary to wait for ACK/NACK feedback receptions. In addition, prior art solutions do not base the determination of the offset on both resource utilization and signal-to-noise-ratio. As a result, the above mentioned object is achieved.

Advantageously, the present solution enables a user equipment to generate a more accurate and up to date channel quality report, which in turn yields better system performance, such as throughput.

Further features of, and advantages with, the present invention will become apparent when studying the appended claims and the following description. It is to be understood that different features of the present invention may be combined to create embodiments other than those described in the following, without departing from the scope of the present invention, as defined by the appended claims.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
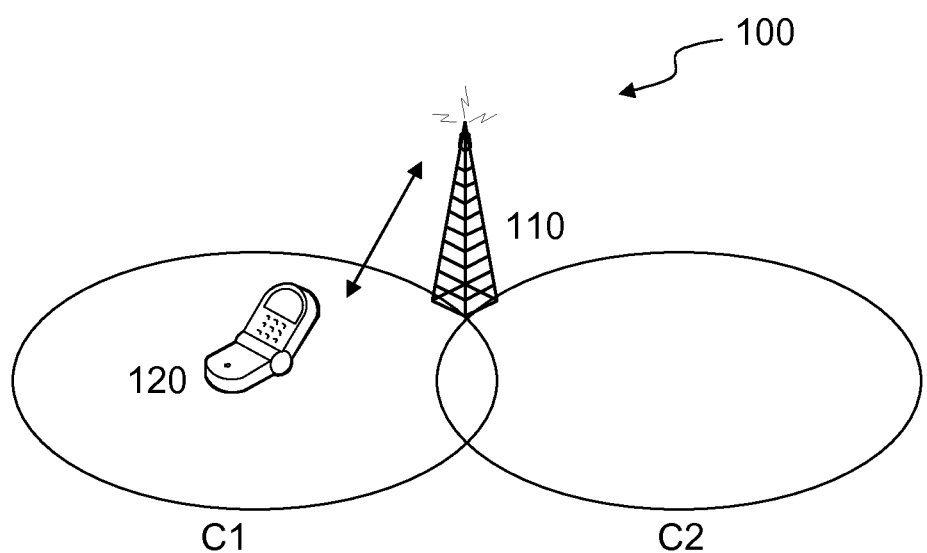
FIG. 1 shows a schematic overview of an exemplifying radio communication system in which the present solution may be implemented.

Throughout the following description similar reference numerals have been used to denote similar elements, parts, items or features, when applicable.

FIG. 1 shows a schematic overview of an exemplifying radio communication system 100, such as an LTE network, in which the present solution may be implemented. The radio communication system 100 comprises a first radio network node 110 and a user equipment 120. The first radio network node 110 serves at least two cells C1, C2 (only two cells are shown for simplicity). The user equipment is, in this example, located in one of said at least two cells C1, C2. The arrow indicates that the user equipment may camp on one of said at least cells C1, C2 associated with the first radio network node 110. The first radio network node 110 may be a base station, radio base station, an eNB or the like.

In some situations, there may be a problem with pessimistic channel quality reports in an LTE network. This is due to the fact that a user equipment 120 makes a measurement on cell specific reference signals (CRS). The channel quality report is based on the measurement. When performing the measurement, the user equipment 120 measures its own channel and its estimated interference on the time-frequency resources that are assigned to the CRS. The CRS are always transmitted from all cells in their respective CRS resources, which leads to a problem, i.e. the inter-cell interference caused by the CRS is also always present. If the cells are time-aligned and synchronized, the CRS from different cells overlap in the frequency domain, meaning that the interference measured by a user equipment 120 may be overestimated compared to the actual inter-cell interference that the mobile station will experience when receiving data.

Overestimating the inter-cell interference will lead to that the user equipment 120 reports a channel quality which is too pessimistic. This will in turn result in a lower system throughput as compared to if the channel quality was more accurately determined. The throughput is lower, because link adaptation, i.e. the dynamically determined transmission parameters, and scheduling work on poor input.

Figure 2:
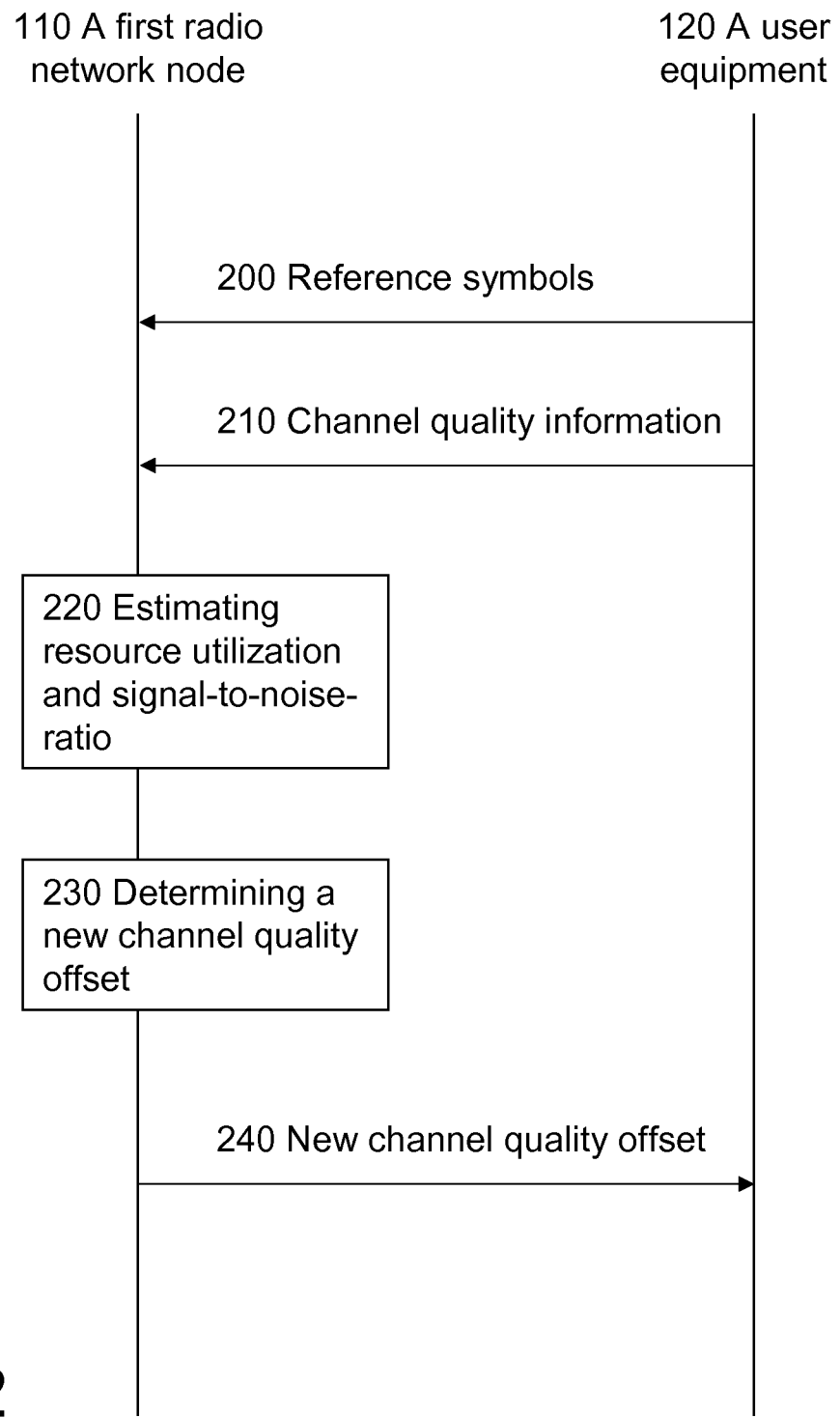
FIG. 2 shows a schematic combined signalling and flow chart of an embodiment of a method in the radio communication system according to FIG. 1 for determining channel quality offset for a channel for sending data from a first radio network node to a user equipment.

FIG. 2 shows a schematic combined signalling and flow chart of an embodiment of a method in the radio communication system 100 according to FIG. 1 for determining a channel quality offset for a channel for sending data from the first radio network node 110 to the user equipment 120. The following steps may be performed. Notably, in some embodiments of the method the order of the steps may differ from what is indicated below.

200 In an optional step, the first radio network node 110 sends to the user equipment 120 reference symbols on the radio channel.

210 In a step 210, the first radio network node 110 receives from the user equipment 120 channel quality information for the radio channel. When the radio communication system 100 is an LTE system, a CQI report from the user equipment 120 is received. In some embodiments, the channel quality information further is based on a signal-to-noise-and-interference-ratio measured by the user equipment 120 on the reference symbols.

220 In a step 220, the first radio network node 110 estimates resource utilization and signal-to-noise-ratio for the user equipment 120 as in known the art and outlined in conjunction with step 3 and 4 below.

The estimation of the resource utilization u may be done internally in the first radio network node 110, in cooperation with other radio network nodes (or base stations), or utilizing measurements from user equipment 120. Resource utilization may be measured as the fraction of used frequency and time resources, averaged or filtered over some time.

The estimation of the signal-to-noise-ratio for the user equipment 120 may be done based on measurements of Reference Signal Received Power (RSRP) from user j, i.e. user equipment 120, or by measuring the uplink signal from user equipment 120. In the former case, the downlink received power (RSRP) is divided with the downlink noise to obtain the downlink SNR. In the latter case, the uplink received power needs to be translated in to a downlink received power by compensating for the differences in transmitted power. The downlink received power is then divided by the downlink noise to obtain the downlink SNR.

230 In a step 230, the first radio network node 110 determines the channel quality offset based on the channel quality information, the resource utilization and the signal-to-noise-ratio.

240 In an optional step 240, the first radio network node 110 sends the channel quality offset to the user equipment 120.

In this manner, an estimate of channel quality offset which takes into account both utilization and SNR is obtained. As a result, the channel quality information generated by the user equipment 120 may become more accurate.

Figure 3:
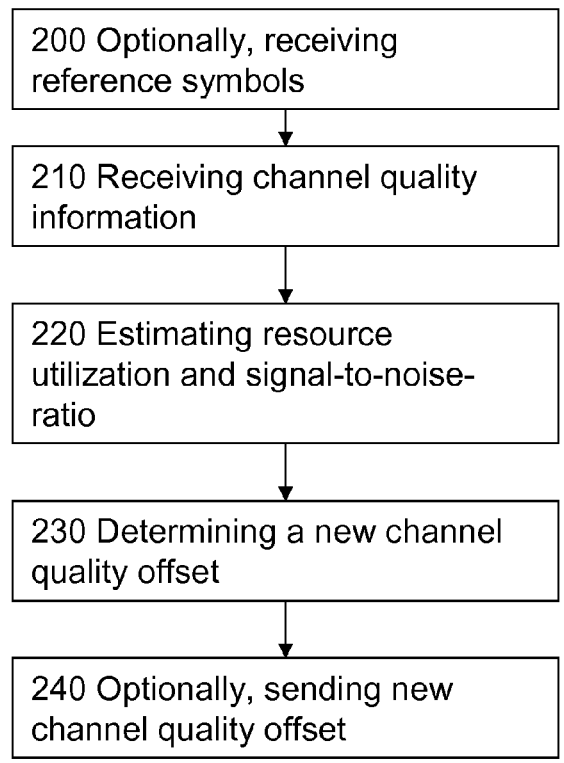
FIG. 3 shows a schematic flow chart of an embodiment of the method in the first radio network node for determining channel quality offset for a radio channel for sending data from the first radio network node to a user equipment.

FIG. 3 shows a schematic flow chart of an embodiment of the method in a first radio network node 110 for determining a channel quality offset for a radio channel for sending data from the first radio network node 110 to a user equipment 120. The following steps may be performed. Notably, in some embodiments of the method the order of the steps may differ from what is indicated below.

200 In an optional step, the first radio network node 110 sends to the user equipment 120 reference symbols on the radio channel.

210 In a step 210, the first radio network node 110 receives from the user equipment 120 channel quality information for the radio channel. In some embodiments, the channel quality information is further based on a signal-to-noise-and-interference-ratio measured by the user equipment 120 on the reference symbols.

220 In a step 220, the first radio network node 110 estimates resource utilization and signal-to-noise-ratio for the user equipment 120.

230 In a step 230, the first radio network node 110 determines the channel quality offset based on the channel quality information, the resource utilization and the signal-to-noise-ratio.

240 In an optional step 240, the first radio network node 110 sends the channel quality offset to the user equipment 120.

In some embodiments of the method for determining channel quality offset, the received channel quality information is based on a previous channel quality offset. When the radio communication system 100 is an LTE system, the first radio network node 110 calculates, in an optional step, $SINRCRSj=CQI_j-CQOpre$, i.e. the difference between the CQI report and the previous channel quality offset. CQOpre is the CQO that was used by the user equipment to generate the channel quality indicator, CQI. Hence, the received channel quality information, e.g. the CQI report, is based on the previous channel quality offset.

In some embodiments of the method for determining channel quality offset, the determined channel quality offset further is based on the previous channel quality offset (when available).

In some embodiments of the method for determining channel quality offset, the step of determining 230 the channel quality offset is performed by a step of setting the channel quality offset to the difference between signal-to-noise-and-interference-ratio for data symbols and the signal-to-noise-and-interference-ratio for reference symbols. The data and reference symbols are sent on the radio channel. Expressed differently, in some embodiments of the method for determining channel quality offset, the channel quality offset is indicative of a difference between the SINR for subcarriers for data and the SINR measured on the reference symbols by the user equipment 120.

In some embodiments of the method for determining channel quality offset, the step of setting is performed by setting the channel quality offset to less than the previous channel quality offset when resource utilization increases. The resource utilization estimated for determination of the channel quality offset is, hence, greater than the resource utilization estimated for determination of the previous channel quality offset.

In some embodiments of the method for determining channel quality offset, the step of setting is performed by setting the channel quality offset to greater than the previous channel quality offset when signal-to-noise-ratio increases. The signal-to-noise-ratio estimated for determination of the channel quality offset is, hence, greater than the signal-to-noise-ratio increases estimated for determination of the previous channel quality offset.

In some embodiments of the method for determining channel quality offset, the radio channel comprises a time slot structure, comprising a sequence of time slots with time slot periods in the time domain, and a sequence of subcarriers in the frequency domain, wherein each time slot comprises a sequence of symbols, wherein the symbols are separated by cyclic prefixes and wherein each symbol comprises one subcarrier. It may be preferred that the time slot periods are of equal duration in time. Hence, the radio communication system 100 is based on an OFDM (Orthogonal Frequency Division Multiplexing) radio communication system, such as an LTE system. A symbol in this context is called a resource element according to 3GPP-terminology.

In some embodiments of the method for determining channel quality offset, the step of sending reference symbols is performed without sending data on the radio channel in the same OFDM symbol. In this manner, interference between data and reference symbols is avoided.

In some embodiments of the method for determining channel quality offset, at least two cells C1, C2, served by the first radio network node 110, are synchronized and time-aligned with respect to the time slot structure.

In some embodiments of the method for determining channel quality offset, the reference symbols are non-shifted reference symbols, wherein non-shifted reference symbols uses the same subcarrier for said at least two cells C1, C2.

In some embodiments of the method for determining channel quality offset, the step of determining the channel quality offset is performed by calculating the channel quality offset, "CQO" as:

$$CQO = SINR(v(u)) - SINRCRS, \text{where}$$

SINR(v(u)) is signal-to-noise-and-interference-ratio for data symbols calculated as:

$$SINR(v(u)) = 1/(v(u)/SINRCRS + (1-v(u))/SNR), \text{where}$$

v(u)=u, or
v(u)=3u/(1+2u) for shifted reference symbols, and
SINRCRS is signal-to-noise-and-interference-ratio for reference symbols calculated as: SINRCRS=CQI−CQOpre, where CQOpre is the previous channel quality offset and CQI is a channel quality indicator for the user equipment 120 obtained using CQOpre, and
u is the resource utilization, and
SNR is the signal-to-noise ratio.

The channel quality indicator may be defined using 3GPP terminology in some embodiments. Advantageously, a formula for how to take into account both SNR and utilization is presented above. As a result, implementation of the present invention is enabled.

In some embodiments of the method for determining channel quality offset, the signal-to-noise-and-interference-ratio for data symbols is given by:

$$SINR(v(u)) = 1/(f(gi) \cdot v(u)/SINRCRSj + (1-f(gi) \cdot v(u))/SNRj).$$

where $f(gi) = 10^{0.04 \cdot (g1-g6)}$, and
g1−g6 is the difference between the strongest and 6th strongest interferers of the user equipment (120).

Now further explaining the formulas presented above, the signal-to-noise-and-interference-ratio (SINR) of a link j is given by $$SINRj = Pj \cdot gj/(\text{sum}(Ui \cdot Pi \cdot gi) + Pnoise)$$

where Pi and gi are the transmit power and pathgain of link j respectively, Ui is a variable indicating the activity of transmitter i, so that Ui=1 for an active transmitter and $U_j$=0 for an inactive transmitter, and Pnoise is the noise power.

The Signal-to-Interference Ratio (SIR) is the SINR excluding the noise, and is given by $$SIRj = Pj \cdot gj/\text{sum}(Ui \cdot Pi \cdot gi)$$

Similarly the Signal-to-Noise Ratio (SNR) is the SINR excluding the interference, and is given by:

$$SNRj = Pj \cdot gj/Pnoise$$

Note that the following relationship between SINR, SNR, and SIR exists:

$$1/SINRj = 1/SIRj + 1/SNRj$$

As an example, in LTE, with synchronized base stations, e.g. a plurality of the first radio network node, and with non-shifted CRS, what is measured by the user equipment 120 is $$SINRCRSj = SINRj(Ui=1 \text{ for all } i) = Pj \cdot gj/(\text{sum}(Pi \cdot gi) + Pnoise),$$

since the CRS are always on.

Further, the SNR may be estimated for example through Reference Signal Receiver Power (RSRP) measurements sent by the user equipment 120. The individual Ui:s are typically not known, but their expected value u=E[Ui] may be estimated the first radio network node 110. It is, hence, desired to be able to express the SINR as a function of the above known quantities (or known to the extent that the quantity may be estimated).

An example of the method according to the present invention for estimating SINR and Channel Quality Offset, CQO, is illustrated in the following. This SIR expression may be simplified by the following approximation:

$$\text{sum}(Ui \cdot Pi \cdot gi) = E(Ui) * \text{sum}(Pi \cdot gi) = u \cdot \text{sum}(Pi \cdot gi) \quad \text{(Approx. 1)}$$

This yields (for v(u)=u above):
SIR(u)=SIR(u=1)/u, where u represents the utilization of the resource elements occupied by the CRS.
The SINR can then be expressed as follows (inversed for simplicity):

$$1/SINR(u) = 1/SIR(u) + 1/SNR =$$
$$= u/SIR(u = 1) + 1/SNR =$$
$$= u \cdot (1/SINR(u = 1) - 1/SNR) + 1/SNR =$$
$$= u/SINR(u = 1) + (1 - u)/SNR$$

This yields:

$$SINR(u)=1/(u/SINR(u=1)+(1-u)/SNR)$$

Using SINR(u=1)=SINRCRSj:

$$SINR(u)=1/(u/SINRCRS+(1-u)/SNR)$$

Hence, SINR is expressed as a function of resource utilization, signal-to-noise-and-interference-ratio and signal-to-noise-ratio.

With shifted CRS, i.e. the CRS from different cells C1, C2 are allocated with three different frequency offsets. This results in that the CRS may be interfered by other CRS from one third of the cells C1, C2, and by data transmission from two thirds of the cells C1, C2.

$$IShiftedCRS=\tfrac{1}{3}*ICRS+\tfrac{2}{3}*Idata=\tfrac{1}{3}*Idata/u+\tfrac{2}{3}*Idata$$

Hence $$Idata=3u/(1+2u)*IShiftedCRS$$

Simple calculations then yield $$SINR(u)=1/(v(u)/SINRCRSShifted+(1-v(u))/SNR)$$

where
v(u)=3u/(1+2u) represents the utilization of the resource elements occupied by the shifted CRS.
Therefore, it may be concluded that $$SINR(v(u))=1/(v(u)/SINRCRS+(1-v(u))/SNR), \text{ where}$$

v(u)=u for non-shifted reference symbols, or
v(u)=3u/(1+2u) for shifted reference symbols.

Another example, referred to as example 2, of the method according to the present invention for estimating SINR and Channel Quality Offset is illustrated in the following. Equation "Approx. 1" above is reasonably accurate when interferers are of similar strength, i.e. $P_i \cdot g_i \approx P_j \cdot g_j$ for all i, j. If this is not the case, typically, $$sum(Ui \cdot Pi \cdot gi < E(Ui) \cdot sum(Pi \cdot gi) = u*sum(Pi \cdot gi).$$

This can be compensated for by letting SIR(u)=f(gi)·SIR(u=1)/u, where typically f(gi)<u.
An empirically derived example is $f(g_i)=10^{0.04 \cdot (g1-g6)}$, where g1–g6 is the difference pathgain between the strongest and 6th strongest interferer. Note that if g1=g6, $f(g_i)$=1, and the example above is achieved.
The SINR may then be expressed as follows (inversed for simplicity):

$$1/SINR(u, gi) = 1/SIR(u) + 1/SNR =$$
$$= f(gi) \cdot u/SIR(u = 1) + 1/SNR =$$
$$= f(gi) \cdot u \cdot (1/SINR(u = 1) - 1/SNR) + 1/SNR =$$
$$= f(gi) \cdot u/SINR(u = 1) + (1 - f(gi) \cdot u)/SNR$$

This yields:

$$SINR(u)=1/(f(gi) \cdot u/SINRCRS+(1-f(gi) \cdot u)/SNR)$$

To implement example 2, the estimation of the utilization is performed by the following steps:
The first radio network node 110 estimates the difference between the strongest and 6th strongest interferers of user j, g1–g6. This may be done based on measurements of Reference Signal Received Power (RSRP) from user j. It may also be estimated based on statistics from previous such measurements from other users in the cell.
The first radio network node 110 sets $f(gi)=10^{0.04 \cdot (g1-g6)}$.
The first radio network node 110 calculates SINR for user j as SINRj (v(u))=1/(f(gi)·v(u)/SINRCRSj+(1−f(gi)·v(u))/SNRj).

Note that other examples of quantifying the difference in strength between interferers also are possible. For example, the difference in strength between other interferers than the strongest and 6th strongest may be considered.

Figure 4:
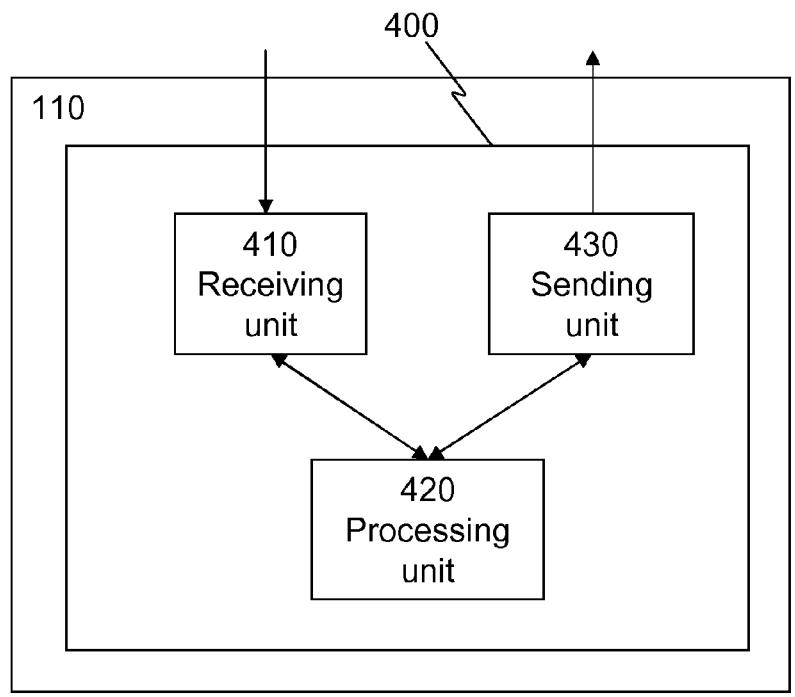
FIG. 4 shows a schematic block diagram of an embodiment of the arrangement in the first radio network node for determining channel quality offset for a radio channel for sending data from the first radio network node to a user equipment.

FIG. 4 shows a schematic block diagram of an embodiment of the arrangement 400 in a first radio network node 110 for determining a channel quality offset for a radio channel for sending data from the first radio network node 110 to a user equipment 120. Optionally, the user equipment 120 is connected to the first radio network node 110. The arrangement 400 may comprise a receiving unit 410 configured to receive from the user equipment 120 channel quality information for the radio channel and a processing unit 420 configured to estimate resource utilization and signal-to-noise-ratio for the user equipment 120. The processing unit 420 further is configured to determine the channel quality offset based on the channel quality information, the resource utilization and the signal-to-noise-ratio.

In some embodiments of the arrangement 400 for determining channel quality offset, the arrangement 400 further comprises a sending unit 430 configured to send to the user equipment 120 reference symbols on the radio channel. The channel quality information further is based on a signal-to-noise-and-interference-ratio measured by the user equipment 120 on the reference symbols. Expressed differently, in some embodiments of the arrangement 400 for determining channel quality offset, the channel quality offset is indicative of a difference between the SINR for subcarriers for data and the SINR measured on the reference symbols by the user equipment 120.

In some embodiments of the arrangement 400 for determining channel quality offset, the sending unit 430 is further configured to send the channel quality offset to the user equipment 120.

In some embodiments of the arrangement 400 for determining channel quality offset, the received channel quality information is based on a previous channel quality offset.

In some embodiments of the arrangement 400 for determining channel quality offset, the determined channel quality offset further is based on the previous channel quality offset (when available).

In some embodiments of the arrangement 400 for determining channel quality offset, the processing unit 420 is further configured to set the channel quality offset to the difference between signal-to-noise-and-interference-ratio for data symbols and the signal-to-noise-and-interference-ratio for reference symbols. The data and reference symbols are sent on the radio channel.

In some embodiments of the arrangement 400 for determining channel quality offset, the processing unit 420 is further configured to set the channel quality offset to less than the previous channel quality offset when resource utilization increases.

In some embodiments of the arrangement 400 for determining channel quality offset, the processing unit 420 is further configured to set the channel quality offset to greater than the previous channel quality offset when signal-to-noise-ratio increases.

In some embodiments of the arrangement 400 for determining channel quality offset, the radio channel comprises a time slot structure, comprising a sequence of time slots with time slot periods in the time domain, and a sequence of subcarriers in the frequency domain, wherein each time slot comprises a sequence of symbols, wherein the symbols are separated by cyclic prefixes and wherein each symbol comprises one subcarrier. It may be preferred that the time slot periods are of equal duration in time. Hence, the radio communication system 100 is based on an OFDM radio communication system, such as an LTE system. A symbol in this context is called a resource element according to 3GPP-terminology.

In some embodiments of the arrangement 400 for determining channel quality offset, the sending unit 430 is configured to send reference symbols without sending data on the radio channel in the same OFDM symbol.

In some embodiments of the arrangement 400 for determining channel quality offset, at least two cells C1, C2, served by the first radio network node 110, are synchronized and time-aligned with respect to the time slot structure.

In some embodiments of the arrangement 400 for determining channel quality offset, the reference symbols are non-shifted reference symbols, wherein non-shifted reference symbols uses the same subcarrier for said at least two cells.

In some embodiments of the arrangement 400 for determining channel quality offset, the processing unit 420 is configured to determine the channel quality offset by calculating the channel quality offset, "CQO" as:

$$CQO = SINR(v(u)) - SINRCRS, \text{ where}$$

SINR(v(u)) is signal-to-noise-and-interference-ratio for data symbols calculated as:

$$SINR(v(u)) = 1/(v(u)/SINRCRS + (1-v(u))/SNR), \text{ where}$$

v(u)=u, or
v(u)=3u/(1+2u) for shifted reference symbols, and
SINRCRS is signal-to-noise-and-interference-ratio for reference symbols calculated as: SINRCRS=CQI−CQOpre, where CQOpre is the previous channel quality offset and CQI is a channel quality indicator for the user equipment obtained using CQOpre, and
u is the resource utilization, and
SNR is the signal-to-noise ratio.

Advantageously, a formula for how to take into account both SNR and utilization is presented above. As a result, implementation of the present invention is enabled.

In some embodiments of the arrangement 400 for determining channel quality offset, the signal-to-noise-and-interference-ratio for data symbols is given by:

$$SINR(v(u)) = 1/(f(gi) \cdot v(u)/SINRCRSj + (1-f(gi) \cdot v(u))/SNRj).$$

where $f(gi) = 10^{0.04 \cdot (g1-g6)}$, and
g1–g6 is the difference between the strongest and 6th strongest interferers of the user equipment (120).

Figure 5:
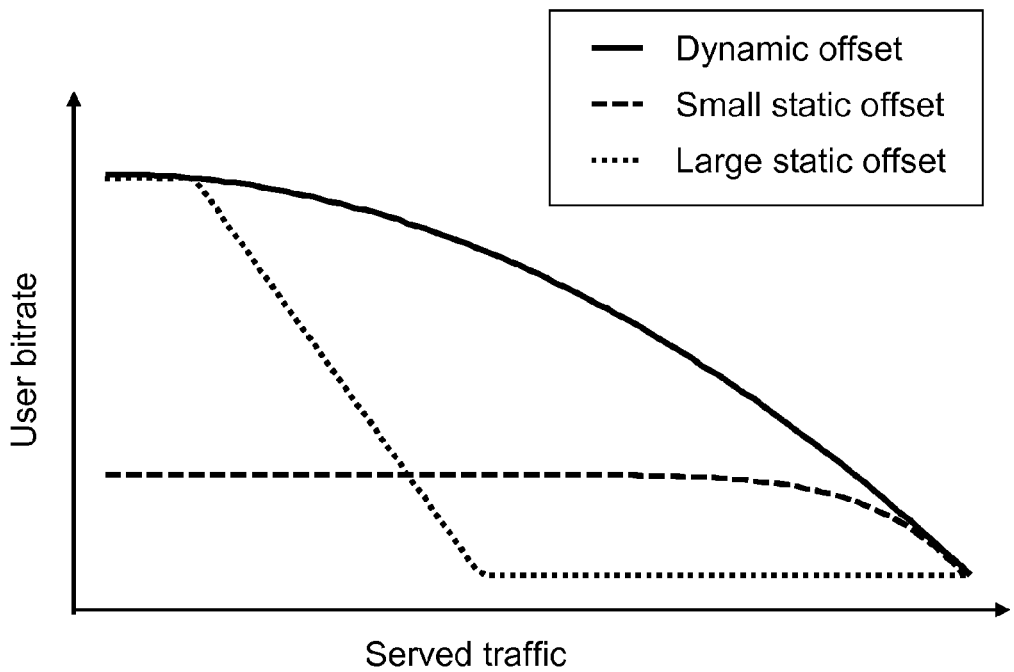
FIG. 5 shows a schematic diagram in which user bitrate is plotted as a function of served traffic to compare a dynamically determined offset with two different static offsets.

In FIG. 5, there is shown a schematic diagram in which user bit rate is plotted as a function of served traffic to compare a dynamically determined offset with two different static off-sets. It may be noted that resource utilization increases with increasing served traffic. This means that a diagram with utilization on the x-axis, i.e. the horizontal axis, would have a similar appearance. The solid line denotes a case referred to as dynamic offset, in which the channel quality offset, or offset, has been dynamically estimated according to a method according to some embodiment of the present invention. The dashed line denotes a case, in which the offset has been statically set to a small value, e.g. 0 dB. The dotted line denotes a case, in which the offset has been statically set to a large value, e.g. 10 dB. From the Figure, it may be seen that the user bit rate, or throughput when the offset is dynamically estimated is overall better or equally good as when the offset is statically set to a large and small value, respectively.

Figure 6:
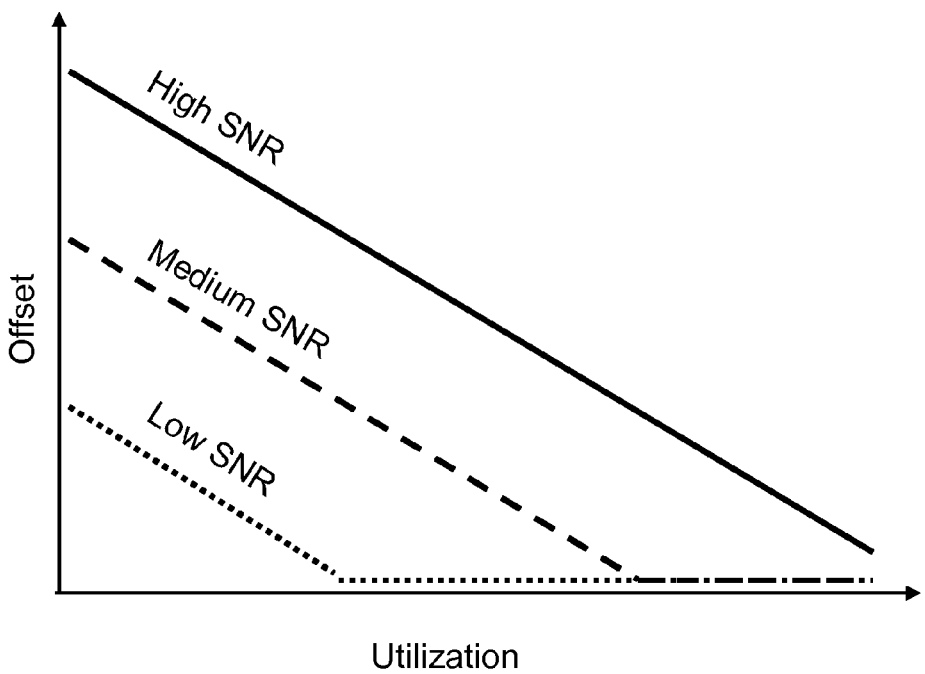
FIG. 6 shows a schematic diagram in which offset is plotted as a function of utilization for different levels of SNR.

In FIG. 6, there is shown a schematic diagram in which desired offsets are plotted as a function of utilization for different levels of SNR. The desired offset are characterized in that the desired offsets are approximately equal to the difference between signal-to-noise-and-interference-ratio for data symbols and the signal-to-noise-and-interference-ratio for reference symbols, such as CRS. The solid line denotes high SNR. The dashed line denotes medium SNR. The dotted line denotes low SNR. It may be noted that a fixed offset is not appropriate for all utilizations and SNR levels. This is solved by the invention, which results in SNR- and utilization dependent offsets, as is shown by the solid line in FIG. 5, close to the desired offsets.

Even though the invention has been described with reference to specific exemplifying embodiments thereof, many different alterations, modifications and the like will become apparent for those skilled in the art. The described embodiments are therefore not intended to limit the scope of the invention, which is defined by the appended claims.

The invention claimed is:

1. A method of operation in a radio network node configured for operation in a radio communication system, said method comprising:
    receiving a reported channel quality from a user equipment that determines the reported channel quality based on measuring a signal-to-noise-and-interference ratio (SINR) for reference symbols transmitted by the radio network node on assigned time-frequency resources and adjusting the measured SINR according to a current value of a channel quality offset at the user equipment, as previously transmitted to the user equipment by the radio network node;
    determining a reference symbol SINR for the user equipment from the reported channel quality;
    estimating a resource utilization that reflects interfering use of the assigned time-frequency resources by one or more other radio network nodes;
    estimating a signal-to-noise ratio (SNR) without interference, for the user equipment;
    estimating a data symbol SINR for the user equipment as a weighted combination of the SNR and the reference symbol SINR, including weighting the reference symbol SINR in proportion to the resource utilization and weighting the SNR in inverse proportion to the resource utilization; and
    calculating a new value of the channel quality offset, based on a difference between the data symbol SINR and the reference symbol SINR; and
    transmitting the new value of the channel quality offset to the user equipment, for use in determining a subsequently reported channel quality.

2. The method of claim 1, wherein the reported channel quality is a Channel Quality Index (CQI) value and wherein determining the reference symbol SINR comprises subtracting the current value of the channel quality offset from the CQI.

3. The method of claim 1, wherein estimating the SNR without interference, for the user equipment resource utilization comprises estimating a signal-to-interference ratio (SIR) for the user equipment, based on path gains and transmit powers associated with the one or more other radio network nodes, and determining the SNR without interference based on the reference symbol SINR and the SIR.

4. The method of claim 1, wherein estimating the resource utilization that reflects interfering use of the assigned time-frequency resources by one or more other radio network nodes comprises calculating the resource utilization as a fraction assigned time-frequency resources used, on an averaged or filtered basis, by the one or more other radio network nodes.

5. An arrangement configured for use in a radio network node that is configured for operation in a radio communication system, said arrangement comprising:
   a receiving unit configured to receive a reported channel quality from a user equipment that determines the reported channel quality based on measuring a signal-to-noise-and-interference ratio (SINR) for reference symbols transmitted by the radio network node on assigned time-frequency resources and adjusting the measured SINR according to a current value of a channel quality offset at the user equipment, as previously transmitted to the user equipment by the radio network node; and
   a processing unit configured to:
     determine a reference symbol SINR for the user equipment from the reported channel quality;
     estimate a resource utilization that reflects interfering use of the assigned time-frequency resources by one or more other radio network nodes;
     estimate a signal-to-noise ratio (SNR) without interference, for the user equipment;
     estimate a data symbol SINR for the user equipment as a weighted combination of the SNR and the reference symbol SINR, including weighting the reference symbol SINR in proportion to the resource utilization and weighting the SNR in inverse proportion to the resource utilization; and
     calculate a new value of the channel quality offset, based on a difference between the data symbol SINR and the reference symbol SINR; and
     transmit the new value of the channel quality offset to the user equipment, for use in determining a subsequently reported channel quality.

6. The arrangement of claim 5, wherein the reported channel quality is a Channel Quality Index (CQI) value and wherein the arrangement is configured to determine the reference symbol SINR by subtracting the current value of the channel quality offset from the CQI.

7. The arrangement of claim 5, wherein the arrangement is configured to estimate the SNR without interference, for the user equipment resource utilization by estimating a signal-to-interference ratio (SIR) for the user equipment, based on path gains and transmit powers associated with the one or more other radio network nodes, and determining the SNR without interference based on the reference symbol SINR and the SIR.

8. The arrangement of claim 5, wherein the arrangement is configured to estimate the resource utilization that reflects interfering use of the assigned time-frequency resources by one or more other radio network nodes by calculating the resource utilization as a fraction assigned time-frequency resources used, on an averaged or filtered basis, by the one or more other radio network nodes.

* * * * *